United States Patent [19]

Andrade et al.

[11] Patent Number: 5,649,161
[45] Date of Patent: Jul. 15, 1997

[54] PREPAGING DURING PCI MASTER INITIATED WAIT CYCLES

[75] Inventors: Victor F. Andrade; Kelly M. Horton, both of Austin, Tex.

[73] Assignee: Advanced Micro Devices, Sunnyvale, Calif.

[21] Appl. No.: 721,211

[22] Filed: Sep. 26, 1996

Related U.S. Application Data

[63] Continuation of Ser. No. 261,486, Jun. 17, 1994, abandoned.
[51] Int. Cl.[6] ................................................ G06F 12/00
[52] U.S. Cl. ............................ 395/494; 395/305; 395/308
[58] Field of Search ................................... 395/305, 306, 395/308, 494, 550

[56] References Cited

U.S. PATENT DOCUMENTS

| | | | |
|---|---|---|---|
| 4,462,073 | 7/1984 | Grondalski | 395/375 |
| 4,918,645 | 4/1990 | Lagoy, Jr. | 395/425 |
| 4,937,791 | 6/1990 | Steele et al. | 365/230.03 |
| 5,335,336 | 8/1994 | Kametani | 395/425 |
| 5,353,423 | 10/1994 | Hamid et al. | 395/425 |
| 5,379,384 | 1/1995 | Solomon | 395/325 |
| 5,392,407 | 2/1995 | Heil et al. | 395/325 |
| 5,396,602 | 3/1995 | Amini et al. | 395/325 |

FOREIGN PATENT DOCUMENTS

| | | |
|---|---|---|
| 344886 | 6/1989 | European Pat. Off. . |
| 2234610 | 6/1991 | United Kingdom . |

OTHER PUBLICATIONS

IBM Technical Disclosure Bulletin, Bus Controller Synchronization, vol. 32, No. 6B, Nov. 1989, pp. 452–453.
Dartford, Kent, GB, Technology Graphics, Graphics demand new personal computer bus, May 26, 1993, No. 5, pp. 18–20.

Primary Examiner—Jack B. Harvey
Assistant Examiner—Jeffrey K. Seto
Attorney, Agent, or Firm—Conley, Rose & Tayon; B. Noel Kivlin

[57] ABSTRACT

A system is disclosed for optimizing data transfer times between an external Master device and main memory. The system includes an integrated processor with a PCI bridge for orchestrating data transfers with the PCI Master over the PCI bus, and a memory controller for controlling access to the main memory. During burst cycles of the PCI Master, the PCI bridge expedites data transfers by providing the memory address to the memory controller early during periods when the PCI Master is slow in transmitting or receiving data. When the PCI Master is unable to respond in a timely fashion, and while the PCI bridge is in control of the local bus, the PCI bridge asserts a MEMWAIT signal to the memory controller to indicate the need to throttle down a data transfer. At substantially the same time, the PCI bridge supplies the memory controller with the next memory address to enable the memory controller to open the appropriate page (and/or precharge the last page) in the memory to expedite subsequent data transfers by asserting (and/or deactivating) the proper row address strobe (RAS) lines. When MEMWAIT is deasserted by the PCI bridge, the memory controller immediately responds by asserting the column address strobe to drive in or drive out the data. As a result of opening the page in memory early, the system potentially saves the RAS access time ($t_{RAC}$) and the RAS precharge time ($t_{RP}$) in the data transfer.

28 Claims, 9 Drawing Sheets

PREPAGING DURING PCI MASTER INITIATED WAIT CYCLES

This application is a continuation of application Ser. No. 08/261,486 filed on Jun. 17, 1994 now abandoned.

BACKGROUND OF THE INVENTION

1. Field of the Invention

The present invention relates generally to the transfer of data between a memory unit and peripheral components in a computer system. More particularly, this invention relates to a system for expediting transactions between main memory and a component external to a central processing unit ("CPU"). Still more particularly, the present invention relates to a system for optimizing the transfer of data between a peripheral master controller and main memory.

2. Description of the Relevant Art

Data generally is transferred between memory and other components in a computer system in two steps. First, the accessing component generates signals on the address bus representing the address of the desired memory location. At the next, or at subsequent, clock cycles, the component actually transfers data on the data bus to or from the addressed memory location. For most computer systems, the number of clock cycles required for a data access to memory depends upon the component accessing the memory and the speed of the memory unit.

The speed of memory circuits is based upon two timing parameters. The first parameter is memory access time, which is the minimum time required by the memory circuit to set up a memory address and produce or capture data on or from the data bus. The second parameter is the memory cycle time, which is the minimum time required between two consecutive accesses to the memory circuit. For dynamic random access memory ("DRAM") circuits, which typically are used to construct the main working memory of the computer system, the cycle time typically is approximately twice the access time. DRAM circuits generally have an access time in the approximate range of 60–100 nanoseconds, with cycle times of 120–200 nanoseconds. The extra time required for consecutive memory accesses in a DRAM circuit is necessary because the internal memory circuits require additional time to recharge (or "precharge") to accurately produce data signals. Thus, a microprocessor running at 10 Mhz cannot execute two memory accesses, in immediate succession (or in adjacent clock pulses), to the same 100 nanosecond chip, despite the fact that a clock pulse in such a microprocessor is generated every 100 nanoseconds. DRAM chips require time to stabilize before the next address in that chip can be accessed. Consequently, in such a situation the microprocessor must execute one or more loop cycles before it can gain access to data in the DRAM circuit. Typically, a memory controller unit ("MCU") is provided as part of the computer system to regulate accesses to the DRAM main memory.

In addition to the delays caused by access and cycle times, DRAM circuits also require periodic refresh cycles to protect the integrity of the stored data. These cycles consume approximately 5 to 10% of the time available for memory accesses, and typically require 256 refresh cycles every 4 milliseconds. If the DRAM circuit is not refreshed periodically, the data stored in the DRAM circuit will be lost.

Because of these limitations, memory constructed with DRAM circuits is not always capable of responding to memory accesses within the time interval allotted by the central processing unit ("CPU") or peripheral master controller. In this event, external circuitry must signal to the CPU (or peripheral master controller) that supplementary processor cycles, or wait states, are necessary before the data is ready on the data bus, or before data from the data bus has been stored by the memory circuits. In addition to slowing the processing of the CPU, wait states generally require use of the CPU local bus, thereby limiting access to the bus by other system circuitry.

As the operating speed of processors increases and as new generations of processors evolve, it is advantageous to minimize wait states to fully exploit the capabilities of these new processors. Obtaining the maximum benefits of these new generations of high speed processors in personal computers, however, is especially difficult, because of size and power limitations of other components in the system, such as the DRAM main memory. With memory intensive applications, such as those involving technical or scientific calculations or computer aided design programs, the memory access time can greatly delay the system operation.

FIG. 1 is a block diagram of a prior art computer system 10 that comprises a microprocessor or central processing unit ("CPU") 12, a CPU local bus 14 coupled to the CPU 12, and a memory controller 16 and a local bus peripheral device 18 both coupled to the CPU local bus 14. A system memory 17 also is shown coupled to the memory controller 16 through a memory bus 15. In addition, a PCI standard bus 20 couples to the CPU local bus 14 through a PCI bus bridge 22. A PCI peripheral device 28 is shown coupled to the PCI bus 20. The PCI peripheral device 28 may comprise a PCI Master controller that is capable of asserting ownership of the PCI bus during PCI Master cycles.

The microprocessor 12 shown in FIG. 1 may comprise a model 80486 microprocessor, and the CPU local bus 14 could comprise an 80486-style local bus. The CPU local bus 14 includes a set of data lines D[31:0], a set of address lines A[31:0], and a set of control lines (not specifically shown). Details regarding the various bus cycles and protocols of the 80486 CPU local bus 14 are not discussed in detail herein, as they are well known by those in the art, and are available in numerous publications. CPU 12, memory controller 16 and PCI bus bridge 22 have traditionally been fabricated on separate integrated circuit chips. A recent trend in computer systems has developed, however, in which the CPU core is combined with a variety of peripheral devices on a single integrated processor chip. An exemplary integrated processor chip includes a bus bridge that provides a high performance interface between an internal CPU local bus and an external PCI bus. By providing a high performance interface to an external PCI bus, relatively high performance characteristics can be achieved with respect to external data transfers.

The PCI bus bridge 22 provides a standard interface between the CPU local bus 14 and the PCI bus 20. As such, the PCI bus bridge 32 orchestrates the transfer of data, address, and control signals between the two buses. PCI bus 20 typically comprises a high performance peripheral bus that includes multiplexed data/address lines, and which supports burst-mode data transfers.

The burst mode feature allows reads or writes to consecutive memory locations at high speed, via burst cycles on the PCI bus. The normal procedure for reading or writing from memory is that the CPU in a first clock cycle generates the address signals on the address bus, and then in the following clock cycle, data is transferred to or from system memory 17. Since the data bus is 32-bits wide, a total of four 8-bit bytes of data can be read or written by the CPU for every two clock cycles. Each set of four 8-bit bytes transferred on the data bus is referred to as a "double word." In burst mode, additional sequential double words may be transferred during subsequent clock cycles without intervening address phases. For example, a total of four double words can be read into the CPU using only five clock cycles because only the starting address is sent out on the address bus, and subsequently the first double word of data is read during the second cycle, the next double word of data during the third cycle, and so on. Burst mode operation thereby accommodates relatively high data transfer rates.

As noted, the PCI peripheral device 28 may comprise a PCI Master controller. In accordance with conventional techniques, the PCI Master may request "ownership" of the PCI bus, so that it can control transactions on the PCI bus 20. As one skilled in the art will understand, a plurality of PCI Masters may be included in the computer system, any of which may request ownership of the PCI bus 20. The PCI Master submits its request for ownership of the PCI bus 20 to the PCI bridge 22 on a control line in the PCI bus 20. The PCI bus bridge 22 typically arbitrates ownership requests among the various PCI Masters, and among the internal masters such as the CPU 12, and other internal masters. Typically, a priority ranking is assigned to each of the various Masters to assist the bus bridge 22 in its priority determination.

The PCI bridge 22 may operate either as a PCI master or as a local bus master. When the CPU 12 accesses PCI "slaves" external to the integrated processor, the PCI bridge 22 operates as a PCI master. Typically, during these PCI master cycles of the PCI bridge 22, either the CPU 12 or another local bus master (such as a DMA Controller) owns the CPU local bus 14 and the PCI bridge 22 owns the PCI bus 20. Conversely, for PCI external master accesses to devices residing on CPU local bus 14, the PCI bridge 22 functions as a slave or target with respect to the external master and functions as a master of CPU local bus 14.

Consequently, when a PCI master (i.e., such as peripheral device 28) gains ownership of the PCI bus 20 and initiates a cycle that corresponds to a device residing on the CPU local bus, such as memory controller 16, the PCI bridge 22 obtains ownership of the local bus 14. During this period, the CPU 12 and the other internal masters cannot use the local bus 14. This can cause considerable delay in system operation because accessing data in the main memory 17 takes at least several clock cycles as discussed above, thus requiring other system resources such as CPU 12 to wait while the data is being accessed from/to the external master. Compounding this problem is the fact that PCI masters may transfer data at very slow rates, and may transfer a plurality of double words through the execution of a burst data transfer. As a result, the bandwidths of the CPU local bus and the system memory bus are limited when PCI masters access system memory 17 in a slow manner.

SUMMARY OF THE INVENTION

The problems outlined above are in large part solved by providing a computer system that includes a PCI bridge to orchestrate data access to main memory from a peripheral PCI Master device. The PCI bus bridge converts burst memory cycles executed by the PCI master into single memory cycles on a CPU local bus. The PCI bridge functions to optimize the data transaction by driving the memory address of the next data transaction on the CPU local bus in instances where the PCI Master is not ready to transmit data during a write cycle, or receive data during a read cycle. A memory controller unit ("MCU") receives the memory address from the CPU local bus, determines that it is within a valid memory region and decodes the address signal into a row address signal and a column address signal. The row address signal is applied immediately to the DRAM memory, together with the appropriate row address strobe signal (RAS) to indicate the bank and page of memory to be accessed. The DRAM memory responds by opening the proper page of memory, thus saving precharge time and access time which would otherwise be necessary to open the DRAM page if the MCU was required to wait until the PCI Master was ready to supply or receive data.

During the period that the PCI bridge is waiting for the PCI Master to supply write data or is waiting for the PCI Master to indicate it is ready to receive read data (after the first data transaction on a burst write and read), the PCI bridge asserts a MEMWAIT signal to the MCU indicating that the data is not ready to be written or read. During this MEMWAIT period, however, and while the PCI bridge has ownership of the local bus, the MCU uses the next address signal to open the appropriate page of memory to expedite the subsequent data transfer. When the data is received by the PCI bridge from the Master (or when the Master indicates it is ready to read data), the PCI bridge deasserts the MEMWAIT signal and the MCU asserts the column address strobe (CAS) signal to effectuate the data transfer.

At substantially the same time that it asserts the MEMWAIT signal, and while the PCI bridge is waiting for the PCI Master to send the next write data, or to indicate it is ready to read the data currently latched by the PCI bridge, the PCI bridge drives the local bus address strobe ADS# to begin the next data transaction, and drives the memory address of the next transaction. Starting the next data transaction cycle earlier by providing the address and control signals enables the MCU to decode the address signal and open the DRAM page while the Master device concurrently gets ready to receive or drive data. Once the DRAM page is open, and while the MEMWAIT signal is active, the MCU "throttles down," or loops through a wait state cycle, until the PCI bridge deasserts the MEMWAIT line to note that the PCI Master is ready to complete the data transfer.

When the MEMWAIT line is deasserted by the PCI bridge, the MCU then "throttles up" the memory access and completes the cycle by asserting the BRDY# line, while maintaining the DRAM page open. After BRDY# is asserted, the PCI bridge starts the next cycle by asserting ADS# and driving the new address onto the CPU local bus. The PCI bridge asserts MEMWAIT to throttle down the memory bus while the MCU decodes the address and determines whether or not the next access is in the same DRAM page or the same DRAM bank. While MEMWAIT is asserted, the next access is performed by opening the appropriate DRAM page.

During the period that MEMWAIT is asserted, a refresh cycle can be initiated by a system timer to any of the banks of the system memory to refresh the DRAM circuits in that bank. The MCU must first latch the addressed memory location before the refresh cycle is serviced. After refresh is completed, the previous page in memory is reopened, unless an address to a different page is received in the interim.

BRIEF DESCRIPTION OF THE DRAWINGS

Other objects and advantages of the invention will become apparent upon reading the following detailed description and upon reference to the accompanying drawings in which.

Figure 1:
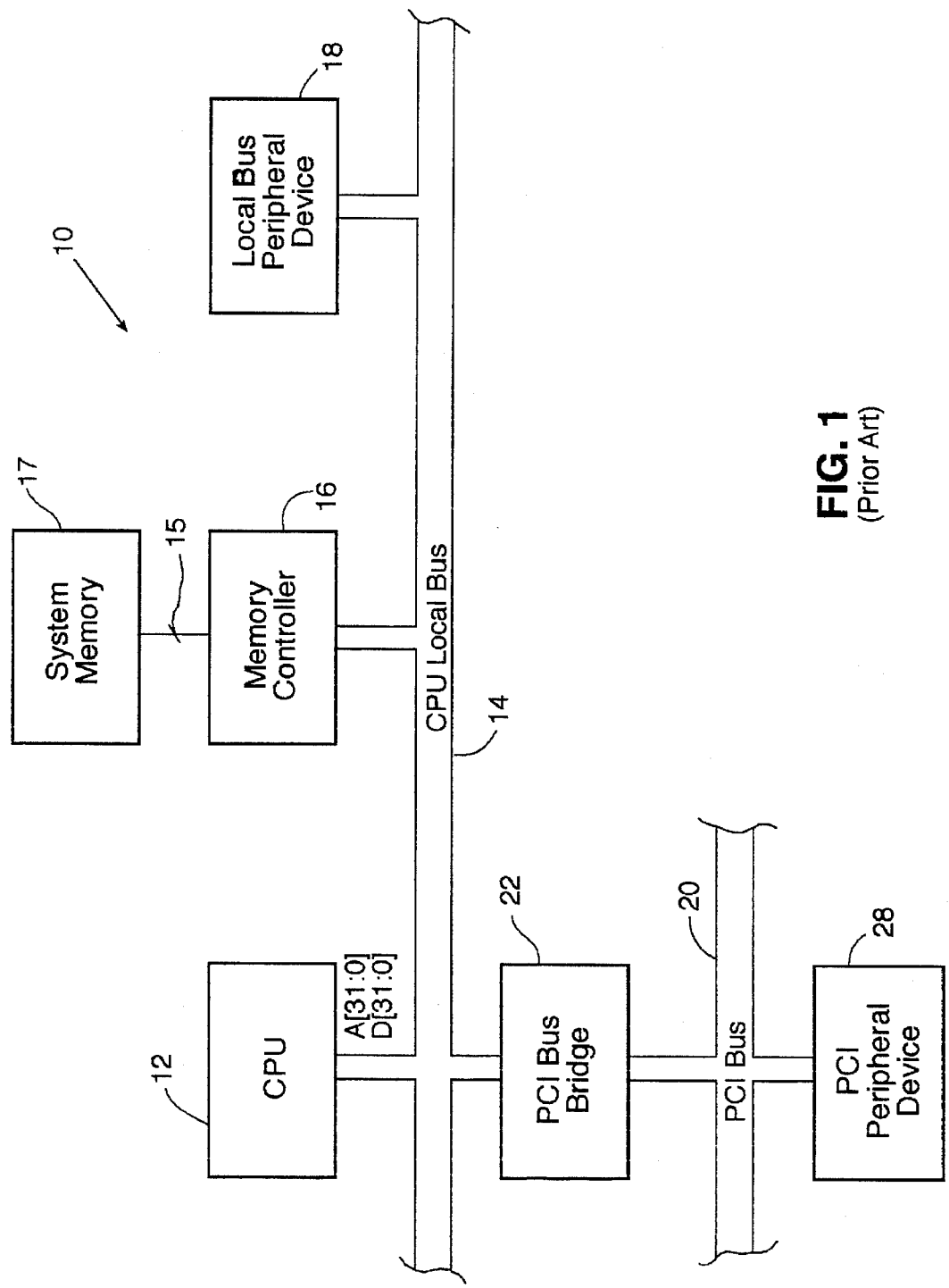
FIG. 1 depicts a functional block diagram of a prior art computer system that supports a PCI Master device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
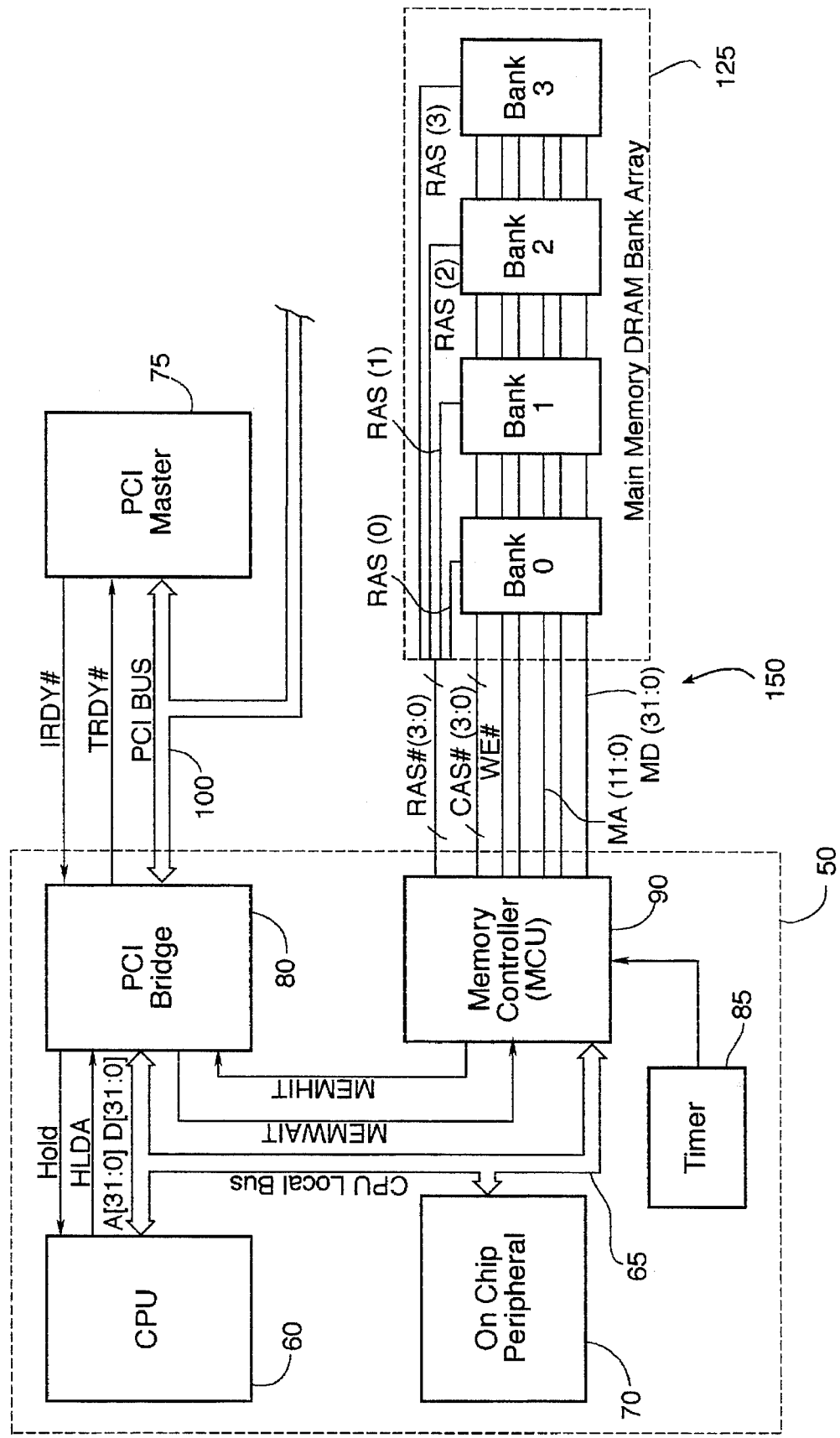
FIG. 2 depicts a functional block diagram of the computer system constructed in accordance with the preferred embodiment.

Referring now to FIG. 2, a computer system constructed in accordance with the preferred embodiment generally comprises an integrated processor ("IP") 50, an external PCI Master 75 connected to the integrated processor 50 via a PCI bus 100, and a main memory unit 125 preferably comprised of DRAM circuits connected to the integrated processor 50 by a memory bus 150. The integrated processor 50 preferably includes a CPU core 60, a CPU local bus 65 coupled to the CPU core 60, a PCI bus bridge 80 capable of interfacing data, address, and control signals between the local bus 65 and the external PCI bus 100, a memory controller unit ("MCU") 90, a timer 85, and an on-chip peripheral device 70. Each of the illustrated components of the integrated processor 50 preferably are fabricated on a single integrated circuit and are housed within a common integrated circuit package.

In the preferred embodiment, the CPU core 60 implements a model 80486 microprocessor instruction set and CPU local bus 65 comprises a model 80486-style local bus. Thus, in the preferred embodiment, the CPU local bus 65 includes a 32-bit set of data lines D[31:0], a 32-bit set of address lines A[31:0], and a set of control lines (not shown specifically). It should be understood, however, that the CPU core could be configured to implement other microprocessor-type instruction sets without departing from the principles of the present invention.

As will be understood by one skilled in the art, the PCI bus bridge 80 preferably forms part of a bus interface unit ("BIU") (not shown specifically) and provides a standard interface between the CPU local bus 65 and the PCI bus 100. As such, the PCI bus bridge 80 orchestrates the transfer of data, address, and control signals between the CPU local bus 65 and PCI bus 100. As noted, the CPU local bus 65 preferably comprises an 80486 style local bus, which as is well known to those skilled in the art, includes separate address and data lines, while the PCI bus 100 includes a plurality of multiplexed address/data lines. Thus, as one skilled in the art will understand, the PCI bus bridge 80 preferably functions to connect the 32-bit address lines A[31:0] of the local bus 65 to the multiplexed address/data lines AD[31:0] on the PCI bus 100, through an appropriate multiplexing unit (not shown). Similarly, the PCI bridge 80 directly connects the 32-bit data lines D[31:0] of the local bus 65 to the multiplexed address/data lines AD[31:0] of the PCI bus 100.

The PCI bridge 80 also generates a number of control signals, including ADS#, R/W, M/IO, Byte-Enables (C/BE#), D/C, and BLAST# that are driven on the control lines of the CPU local bus 65. According to normal convention, the ADS# is an address strobe control signal that functions to initiate a read or write cycle on the CPU local bus 65. The PCI bridge 80 generates the ADS# signal for bus cycles that have targets on the local bus 65. The ADS# signal preferably is an active low strobe signal. The PCI bridge 80 also generates a R/W signal in response to the status of the C/BE#(0) line on the PCI bus to indicate whether the transaction comprises a read or a write cycle. The M/IO indicates the cycle status to the memory or I/O devices. Finally, the BLAST# signal indicates whether data is being transferred in a burst mode or in single accesses on the local bus. In accordance with the preferred embodiment, the PCI bridge 80 also transmits a MEMWAIT signal to and receives a MEMHIT signal from the memory controller unit ("MCU") 90. These signals may be transmitted over direct electrical connections between the PCI bridge 80 and the MCU 90 as shown in FIG. 2, or may be provided over control lines in the CPU local bus 65.

The PCI bridge 80 also receives RDY#/BRDY# control signals from components on the CPU local bus to indicate the completion of a cycle by that component. For example, the memory controller 90 asserts a BRDY# signal to indicate that it has received data or is providing data on the data lines D[31:0]. On the PCI bus 100 side, PCI bridge 80 generates a TRDY# output signal that preferably connects to the PCI Master 75 through a control line as shown in FIG. 2. Similarly, the PCI bridge 80 preferably receives an IRDY# from the PCI Master 75 through a control line between the PCI Master 75 and integrated processor 50. Data is transferred when IRDY# and TRDY# are both asserted.

The CPU internal local bus 65 preferably is a multi-master bus capable of supporting a plurality of bus masters. The CPU 60, the PCI Bridge 80, and the peripheral device 70 (which may for example comprise a direct memory access controller) may each claim ownership of the CPU local bus 65. Ownership of the internal local bus 65 by these internal masters typically is arbitrated by the Bus Interface Unit (BIU) or other bus arbiter (not specifically shown).

As will be discussed in more detail below in the operation of the present invention, the PCI bridge 80 may function as a PCI Master. When the integrated processor 50 accesses external PCI "slaves," the PCI bridge 80 operates similar to other external PCI masters by obtaining ownership of the PCI bus 100. Thus, when the CPU core 60, or the peripheral device 70 claim ownership of the CPU local bus 65, the PCI bridge 80 preferably claims ownership of the PCI bus 100 if the cycle is directed to a device residing on PCI bus 100.

Conversely, where a PCI external master seeks access to a device that resides on CPU local bus 65, the PCI bridge 80 operates as a slave or target for the external PCI master. The PCI bridge responsively executes a corresponding cycle on the CPU local bus 65 to thereby allow the external PCI master to read and write data allocated within system memory 125, for example. During these PCI master cycles, therefore, an external PCI master owns the PCI bus 100 and the PCI bridge 80 owns the local bus 65. When the PCI bridge 80 requests ownership of the CPU local bus 65, it generates a HOLD request to the CPU 60, which returns an acknowledgement signal HLDA to the PCI bridge 80 when mastership has been granted.

The memory controller 90 preferably comprises a unified control unit which supports a high performance 32-bit data path to main memory 125. In the preferred embodiment, the memory controller 90 provides for a direct connection of four 32-bit banks supporting up to 256 MB of DRAM using Industry standard modules. The MCU 90 controls access to the main memory 125 and connects to the CPU local bus 65 to provide a path to memory for the CPU 60, PCI bridge 80, and other peripheral components (shown generally as 70). The MCU 90, as noted above, preferably provides a MEM-HIT signal to the PCI bridge 80 and receives a MEMWAIT signal from the PCI bridge in accordance with the principles of the present invention. The MCU 90 also receives a timing signal from the system timer 85.

Referring still to FIG. 2, the MCU 90 preferably connects to the main memory 125 through a memory bus 150 that includes address lines MA[11:0], memory data lines MD[31:0], row address strobe ("RAS") lines RAS#(3:0), column address strobe ("CAS") lines CAS#(3:0), and a write enable line WE#. An address signal is transmitted on the memory address lines MA[11:0] to select the location in memory to be accessed for multiplexed and non-multiplexed memory devices. The data lines (MD31–MD0) are memory data bus lines for transferring data to and from the DRAM circuits and the integrated processor 50, or other external devices, in accordance with conventional techniques. The write enable signal WE# indicates whether the memory access is a write cycle and typically is captured from the W/R control signal on the CPU local bus.

In accordance with customary techniques, the row address strobe (RAS) lines (RAS3#–RAS0#) preferably comprise active low outputs that are used by the DRAM circuits to clock in row address data from the memory address bus MA[11:0] for each DRAM bank. In the preferred embodiment, one RAS line is dedicated to each bank. Four RAS lines are provided in the preferred embodiment where four DRAM banks are used. Similarly, four column address strobe (CAS) lines (CAS3#–CAS0#) are provided as active low outputs that are used by the DRAM circuits to clock in column address data from the memory address bus MA[11:0] for each bank of the DRAM bytes, one CAS per byte. Thus, for example, CAS3# is the DRAM column address strobe for byte 3 in each DRAM bank.

Referring still to FIG. 2, the main memory 125 preferably comprises DRAM circuits configured into a plurality of banks, with each bank 32 bits (or 4 bytes) wide. As will be understood by one skilled in the art, each of the DRAM banks typically are sub-divided into "pages." The page size depends upon the size of the respective DRAM chips that are used. To enable the DRAM chips to operate with fewer connector pins, which decreases the number of chips that can be located on the system board, the DRAM chips are addressed in a multiplexed fashion; that is the address of each memory cell is transmitted in two parts. The first half of the address defines the row address and the second half defines the column address. In the preferred embodiment, the first twelve lines of the memory address bus MA(11:0) are multiplexed outputs and convey the row address location during RAS signals and column address location during CAS signals. An individual memory cell, therefore, is selected by a column address and a row address. The conventional manner in which the row address and column address signals are applied to the DRAM memory is illustrated in the conventional timing diagram of FIGS. 3A and 3B.

Figure 3A:
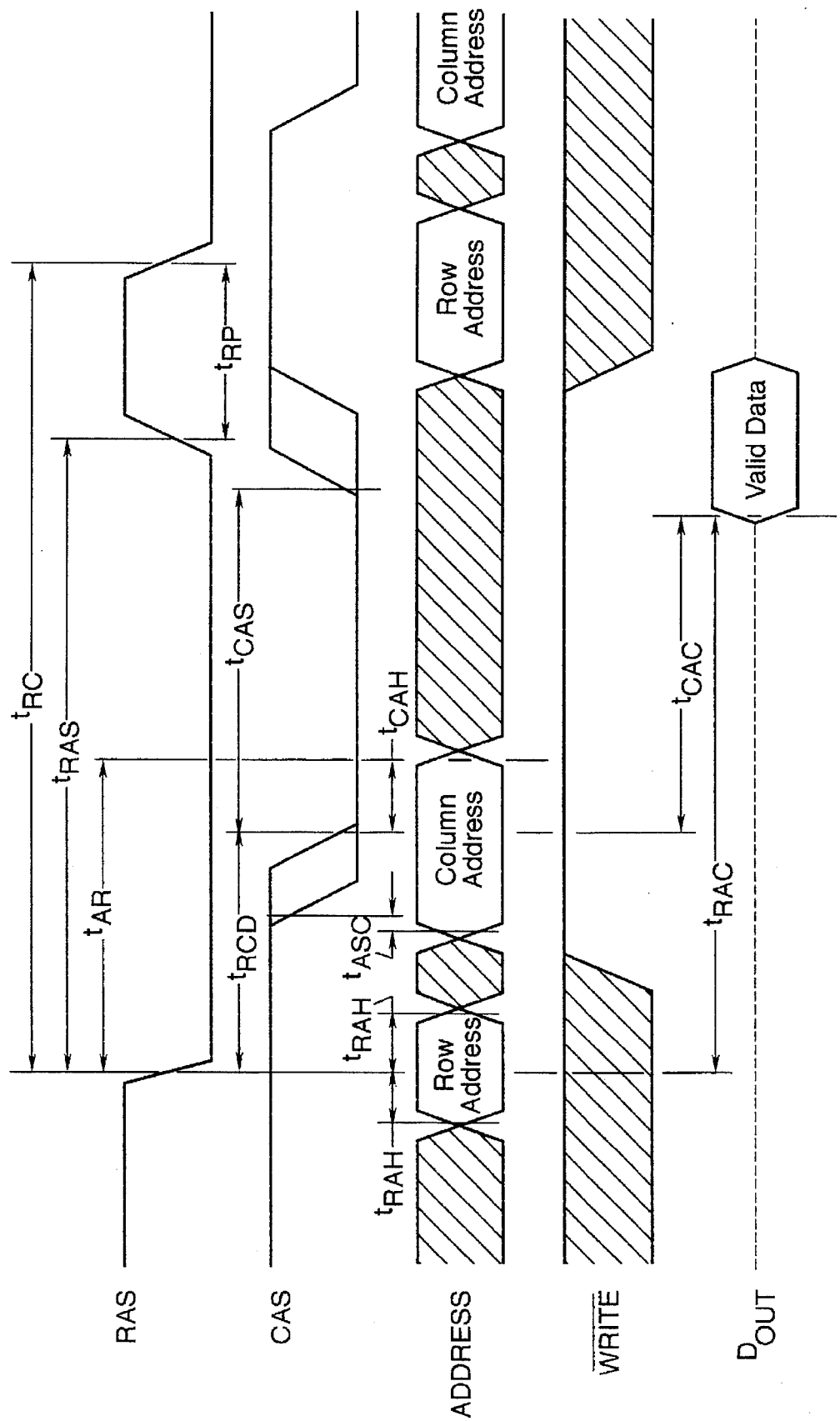
FIGS. 3A–3B show timing diagrams of typical read and write cycles.
Figure 3B:
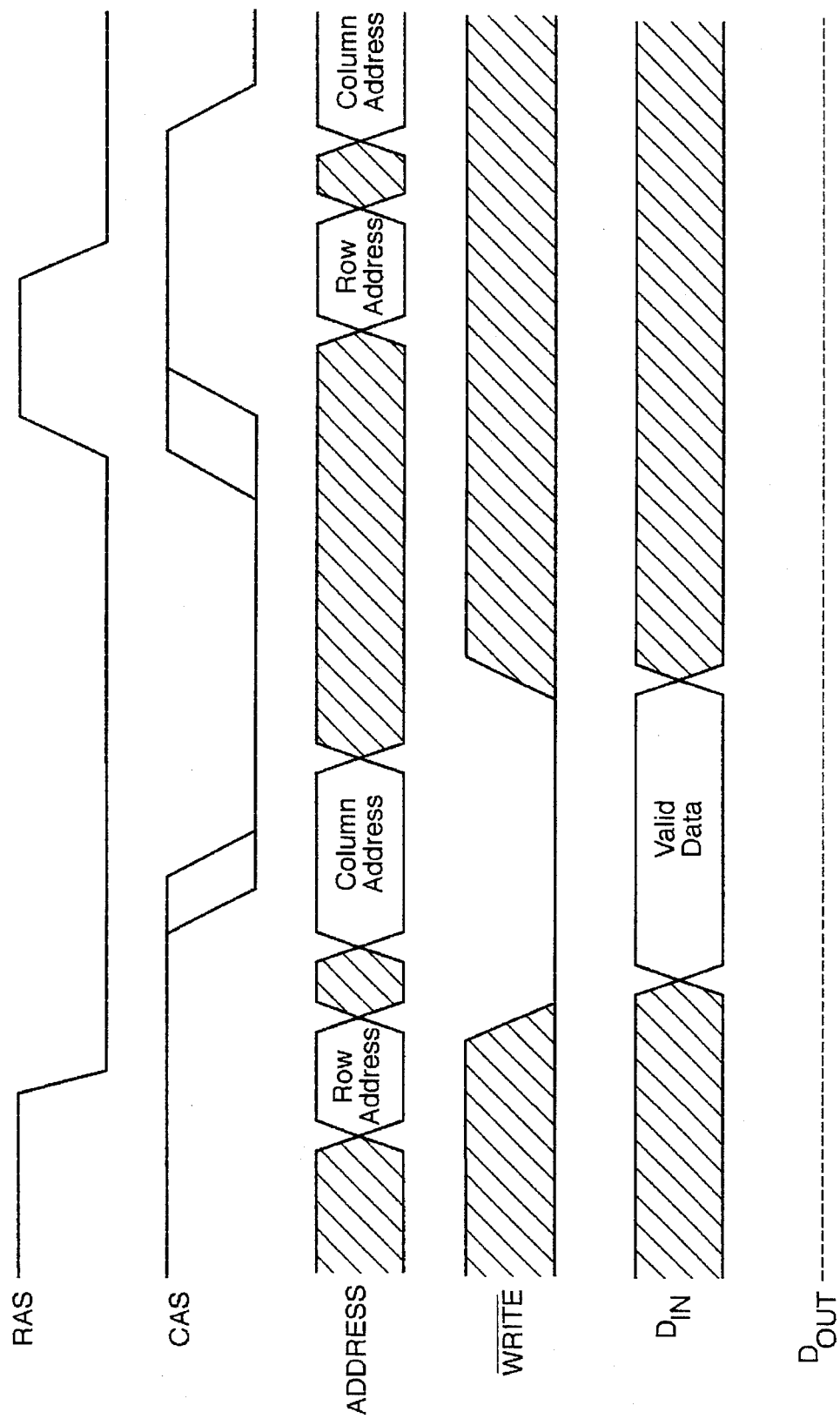

As shown generally in FIGS. 3A (read cycle) and 3B (write cycle), the row address is driven on the address inputs of the DRAM memory when the RAS (row address strobe) control line is asserted (i.e. RAS is driven low). This clocks the row address into an internal row address latch. The row address must be stable for a period ($t_{ASR}$) before RAS is asserted, and for a period ($t_{RAH}$) after RAS is asserted. The address inputs then are changed to the column address, and CAS (column address strobe) is asserted (CAS is driven low). CAS also functions as the output enable, so that whenever CAS is asserted, the three-state driver on the data pin out is enabled. The time when CAS can be asserted is determined by the minimum RAS-to-CAS delay period ($t_{RCD}$). The data is available after the access times from RAS (which is denoted as $t_{RAC}$) and CAS (which is denoted as $t_{CAC}$) have both been met. The limit of performance is determined by the access time from RAS ($t_{RAC}$). Another timing parameter that is critical to memory accesses is the RAS precharge time ($t_{RP}$). The precharge time ($t_{RP}$) is the time required for the DRAM circuit to recover from the previous access. Another cycle cannot be started to the same DRAM device the instant that data is available. Thus, the cycle time for dynamic memories is greater than the access time. The difference between the access time and the cycle time is the precharge time. These timing characteristics of DRAM circuits become critical as one attempts to expedite memory transactions.

Referring again to FIG. 2, another important factor with respect to the operation of the DRAM main memory 125 relates to the need to periodically refresh the DRAM circuits. As one skilled in the art will understand, typically only one transistor is used in an individual DRAM circuit to store a data bit. The transistor functions merely as a switch that stores a small electrical charge in a capacitor. The size of the charge determines whether a "zero" or a "one" is stored. Because all capacitors experience leakage, the charge on the capacitor in the DRAM chip slowly dissipates as a result of insulator losses. Eventually the charge on the capacitor dissipates completely and the memory content would be lost. The solution to this problem is to read the DRAM circuits before the data are lost and to rewrite the DRAM chip again with the same data. This procedure is referred to as "refreshing" the DRAM.

The DRAM refresh rate preferably is derived from the system timer 85. In the preferred embodiment, a "hidden" CAS before RAS staggered refresh scheme is used so that most DRAM refresh cycles will not affect system performance. To further minimize the period required for the refresh cycle, the MCU 90 preferably does not perform refresh cycles to empty banks (i.e. where no DRAM circuits are provided in a particular bank of DRAM memory). The staggered refresh reduces instantaneous current demands by refreshing each DRAM bank independently. In this manner, bank 0 is refreshed, then bank 1 is refreshed, and so on. The period at which refresh cycles occur is determined by the system timer 85. The clock provided by the timer preferably is four times the standard frequency (which is 256 KHz) so that a refresh cycle begins every 4 microseconds, the effective refresh period being that of 256 cycles in 1 millisecond. Consequently, the timer output can be used to drive each DRAM bank separately and in succession within the standard refresh period of 4 milliseconds to execute 256 refresh cycles. In this manner, each bank receives a refresh cycle approximately every 15.625µ sec., without any bank being refreshed simultaneously. In accordance with conventional techniques, a refresh cycle is initiated by asserting CAS before the leading edge of RAS, which does not occur during normal DRAM accesses.

The on-chip peripherals block 70 preferably represents a variety of peripheral devices that may be implemented in the integrated processor 50. For example, components such as a direct memory access controller ("DMA") or an interrupt controller may be included as an integral part of the integrated processor package. As one skilled in the art will understand, various peripherals may be provided as part of the integrated processor 50.

Referring still to FIG. 2, the PCI bus 100 and the PCI Master device 75 will now be described in greater detail. The PCI bus 100 is a high performance 32-bit multiplexed address/data bus with multi-master capabilities, capable of supporting several PCI masters. In the preferred computer system embodiment, any PCI master can request control of the PCI bus, and upon being granted ownership of the bus, it can generate cycles to any PCI target device.

The multiplexed address/data lines AD[31:0] and the control lines of the PCI bus 100 preferably connect to the PCI bridge 80 and to PCI peripheral components such as the PCI Master 75. The control lines preferably include command/byte enables, a cycle frame signal, a target ready signal, and an initiator ready signal. The command/byte enables (C/BE3#–C/BE0#) transmit multiplexed transfer command and byte enable data on the same lines. The command/byte enable lines C/BE[3–0]# define the bus command during the address phase. During a data phase, C/BE[3–0]# are used as byte enables that determine which byte lanes carry meaningful data.

The Cycle Frame signal (FRAME#) is a sustained input/output signal, which preferably comprises an active low signal driven by a PCI Master to indicate the beginning and duration of a transaction. FRAME# therefore is asserted to signal the beginning of a bus transaction. When FRAME# is de-asserted the transaction is in the final data phase. It is noted that IRDY# must be asserted on the same clock edge that FRAME# is deasserted to mark the last data phase.

The Target/Local Bus Ready (TRDY#/LRDY#) comprises an active low input signal driven by PCI and CPU local bus targets to indicate the ability of the target to complete the current data phase. The Initiator Ready signal (IRDY#), which is used in conjunction with TRDY#, comprises an active low signal indicating the ability of a PCI Master to complete the current data phase. During a write cycle, for example, IRDY# indicates that valid write data is present on AD[31–0].

Additional features regarding the PCI bus are described in the publication "PCI Local Bus Specification," PCI Special Interest Group, Hillsboro, Oreg., the details of which are incorporated by reference herein.

Referring still to FIG. 2, the operation of the present invention will now be described in accordance with the preferred embodiment. The PCI Master 75 requests ownership of the PCI bus 100 by driving a request on the PCI bus. The PCI bridge 80 in response sends a HOLD signal to the CPU 60 to request ownership of the CPU local bus 60. The CPU 60 grants ownership of the local bus 65 by asserting a HLDA signal, which is received by the PCI bridge 80. The PCI bridge 80 then acknowledges that the PCI Master device 75 owns the PCI bus 100 by sending an appropriate bus grant signal to the Master device 75.

Upon assertion of the FRAME# signal by the PCI Master 75, the multiplexed address data lines AD[31:0] of the PCI bus 100 are driven with a valid address by the PCI Master 75. The PCI bridge 80 captures the address and provides it on the CPU local bus 65. If the address corresponds to a location in memory, the MCU 90 issues a MEMHIT signal to the PCI bridge 80, which in turn issues a device select (DEVSEL#) to the PCI Master to claim the transaction. The cycle definition/byte enable lines C/BE[3:0] of PCI bus 100 are subsequently driven with a cycle status opcode to indicate that the present cycle is a write (or read) operation. In accordance with the preferred embodiment, the M/IO signal of the PCI bridge is captured from the C/BE[2] line of PCI bus, and the read/write signal R/W of the PCI bridge is captured from the C/BE[0] line of PCI bus. Subsequently (in a write cycle), the PCI Master 75 drives the data it wishes to write on the AD lines of the PCI bus 100, and asserts the IRDY# signal to indicate that valid data is present on the PCI bus.

If the cycle initiated by PCI Master 75 is a burst mode operation, the PCI Master 75 transmits an initial memory address, and then subsequently drives a data signal on the PCI bus 100. On successive cycles, the PCI Master 75 only drives data signals on the bus 100, with the understanding that the memory address is to be incremented four bytes for each successive data transmission.

In response to the burst transmission from the PCI Master 75, the PCI bridge 80 generates a sequence of back-to-back memory cycles. Once the CPU is placed on hold by PCI bridge 80, the burst cycle from the PCI Master 75 is transformed into a sequence of single cycle data transfers on the CPU local bus 65 by keeping the BLAST# signal asserted in accordance with conventional techniques. According to the principles of the present invention, each of the single accesses to the main memory by the PCI bridge 80 may then be throttled to the speed of the PCI Master without compromising performance, even when the Master device is running at top speed.

The operation of the present invention differs depending upon whether the PCI bridge is performing a write cycle to memory or a read cycle to memory. The specifics of each of these cycles will be described next. During a write transaction, the burst cycle from the PCI Master 75 is transformed by the PCI bridge 80 into a sequence of single cycle write accesses on the CPU local bus 65. The PCI master first drives the address of the location in memory that it wishes to access on the AD lines AD[31:0] of the PCI bus. PCI bridge 80 responsively drives the address on CPU local bus 65 and MEMHIT is issued by the MCU 90 (if a hit occurs). Device Select is then asserted by the PCI bridge 80 back to the PCI master. The data is driven on the PCI bus by the PCI master (marked by IRDY#), and the data is latched into the PCI bridge 80 (marked by TRDY#). Once the PCI bridge 80 receives the address and the first data information from the PCI Master 75, the PCI bridge 80 begins its cycle on the CPU local bus 65 by asserting the ADS# signal, and driving the address and data signals onto the CPU local bus. The MCU 90 proceeds to write the data to the specified address in memory, and asserts a BRDY# control signal to the PCI bridge 80 on the CPU local bus 65 to indicate that it has received the first double word of the data write cycle.

For subsequent data writes to memory (during the burst cycle on the PCI bus), the present invention "throttles" the memory by issuing MEMWAIT and by providing the memory address of the next double word of data to the MCU 90 before the corresponding double word is received from the PCI Master 75. This allows the MCU 90 to open the page in memory where the data is to be written ahead of time. Consequently, the MCU 90 is essentially able to "look ahead" to determine where the next data write will occur, and can begin accessing that page of memory before the data is actually transmitted by the PCI Master 75.

This ability to look ahead is achieved by starting the second and all subsequent data transfers during the burst cycle immediately after the MCU 90 returns the BDRY# signal. After receiving the BRDY# signal from the MCU 90, the PCI bridge 80 asserts the TRDY# signal to indicate to the PCI Master device 75 that the target (i.e. the MCU) is ready or has completed a data write transaction. On the next clock signal, the PCI Master may drive the next data to be written if it is ready, and will assert IRDY# to show that valid data is being driven on the AD lines. If, however, the PCI Master 75 is slow and data is not yet ready to be delivered, IRDY# is deasserted by the PCI Master to indicate that it does not have valid data ready. If IRDY# is deasserted on the clock cycle following assertion of TRDY#, the PCI bridge 80 continues to assert the MEMWAIT signal to the MCU 90 thereby preventing the MCU from writing invalid data. It is noted that the MEMWAIT signal is unconditionally asserted for at least one clock cycle. In addition to providing the MEMWAIT signal, the PCI bridge 80 drives out on the CPU local bus 65 the memory address of the next write location and simultaneously asserts the ADS# signal, which causes the MCU 90 to latch the address signal. The MCU then asserts the appropriate row address strobe (RAS) line, to thereby allow the page where the next address is located to be opened in the appropriate bank in DRAM memory.

Once the PCI Master device 75 is ready to drive the data, which is marked by the assertion by the Master of IRDY#, the data is transferred from PCI bus 100 to CPU local bus 65 via PCI bridge 80, and the MEMWAIT signal is deasserted by the PCI bridge 80. The MCU 90 responsively latches in the data and asserts the column row strobe (CAS) to complete the transfer. As a result of this procedure, it is possible to save the RAS access time ($t_{RAC}$) if the address was in a different DRAM bank, or both the access time for RAS ($t_{RAC}$) plus the RAS precharge time ($t_{RP}$) if the address was to a different page in the same DRAM bank.

On the first cycle of a burst read transaction by PCI Master 75, conversely, the cycle to system memory 125 starts after mastership of both the PCI bus 100 and the CPU local bus 65 has been attained. The PCI Master 75 indicates the cycle by asserting the FRAME# signal and driving the address lines of PCI bus 100 with the address of the requested data. The PCI bridge 80 substantially simultaneously drives the address in memory which is to be read. The MCU 90 receives the read address and issues the MEMHIT signal if the address corresponds to an address in main memory 125 and in response the PCI bridge issues the DEVSEL# signal to the Master 75. The PCI Master 75 continues the transaction and the PCI bridge 80 asserts the local bus address strobe signal ADS# causing the MCU 90 to latch in the address signal. The MCU 90 then proceeds to access the row and column of the memory and returns valid data marked by the assertion of BRDY# on the local bus 65. In response, the PCI bridge 80 issues a TRDY# signal on the PCI bus 100 and immediately starts the next read cycle to memory.

If the PCI Master 75 does not assert IRDY# in response (or before) to the TRDY# signal, the read cycle is throttled with the PCI bridge 80 asserting MEMWAIT to the MCU 90. While MEMWAIT is asserted, the MCU 90 receives the next read address from the PCI bridge 80 and decodes the address signal into a row and column address. The MCU 90 then uses the row address, enabled by the assertion of the proper RAS line, to open the page in memory where the read address is located. In the preferred embodiment, the MCU 90 also drives out the data onto the memory bus 150 by applying the column address enabled by the appropriate CAS line. As a result, the data to be read is driven on the local bus while MEMWAIT is still asserted.

When the PCI Master device 7S asserts IRDY# and receives the first data phase, the next read cycle proceeds with the deassertion of MEMWAIT by the PCI bridge 80. If the next data has been loaded onto the local bus in accordance with the preferred embodiment, the MCU 90 immediately responds with a BRDY# signal and the PCI bridge 80 issues the TRDY# signal to indicate to the PCI Master that the next data phase is ready to be read. After issuing the TRDY# signal, the PCI Master immediately begins the next read cycle by asserting ADS# and driving the next read address on the local bus and asserting MEMWAIT.

The principles of the present invention may also be implemented during refresh cycles to permit the refresh cycles to be performed while MEMWAIT is asserted. If a refresh request is issued to the same DRAM bank on which the page is open and while MEMWAIT is asserted, the MCU 90 preferably starts the CAS-before-RAS refresh cycle by keeping the CAS lines active and deasserting the RAS line to begin the precharge cycles. Once the precharge cycles are completed, the MCU 90 asserts the RAS line to start the refresh cycle until the $t_{RAS}$ time is met, at which time the RAS line is deasserted to start the precharge cycles again. At the completion of the precharge cycles, the MCU 90 reopens the previous DRAM page and continues to throttle down the memory bus if MEMWAIT is still asserted.

If MEMWAIT is deasserted during the refresh cycle, the MCU 90 preferably waits until $t_{RAS}$ is met and deasserts the RAS line to start the precharge cycles. At the completion of the precharge cycles, the MCU 90 opens the previous DRAM page and completes the memory access after asserting BRDY# to the PCI bridge 80. The DRAM page then remains open until a refresh request occurs or until a subsequent data access is made to a different DRAM page by another Master. The time saved in this sequence is the $t_{RAC}$ period by opening the DRAM page ahead of time after refresh is completed.

If the refresh request is issued to a different DRAM bank, and while MEMWAIT is asserted, the MCU 90 preferably deasserts the current active RAS line to close the current page, while keeping the CAS lines active, and immediately asserts the RAS line of the new bank to start the refresh cycle. The new RAS line is kept active until $t_{RAS}$ is met, at which time the RAS line is deasserted to start precharge. At the end of the precharge cycles, the MCU 90 opens the previous DRAM page and continues to throttle down the memory bus if MEMWAIT is still asserted.

If, conversely, MEMWAIT is deasserted during the refresh cycle, the MCU preferably waits until $t_{RAS}$ is met and deasserts the RAS line to start the precharge cycles. At the completion of the precharge cycles, the MCU opens the previous DRAM page and completes the memory access after asserting BRDY#. The DRAM page remains open until a refresh request or another PCI Master issues a memory request to a different page. Once again, the time saved is the $t_{RAC}$ period by opening the DRAM page ahead of time after refresh is completed.

To further facilitate an understanding of the manner in which the protocol of the present invention is implemented, exemplary timing diagrams will now be discussed. FIGS. 4A–4E are timing diagrams that illustrate the data, address, and control signals associated with read and write cycles to different locations in main memory. The state of the DRAM memory is shown in the bottom row of the timing diagram to facilitate an understanding of these diagrams.

Figure 4A:
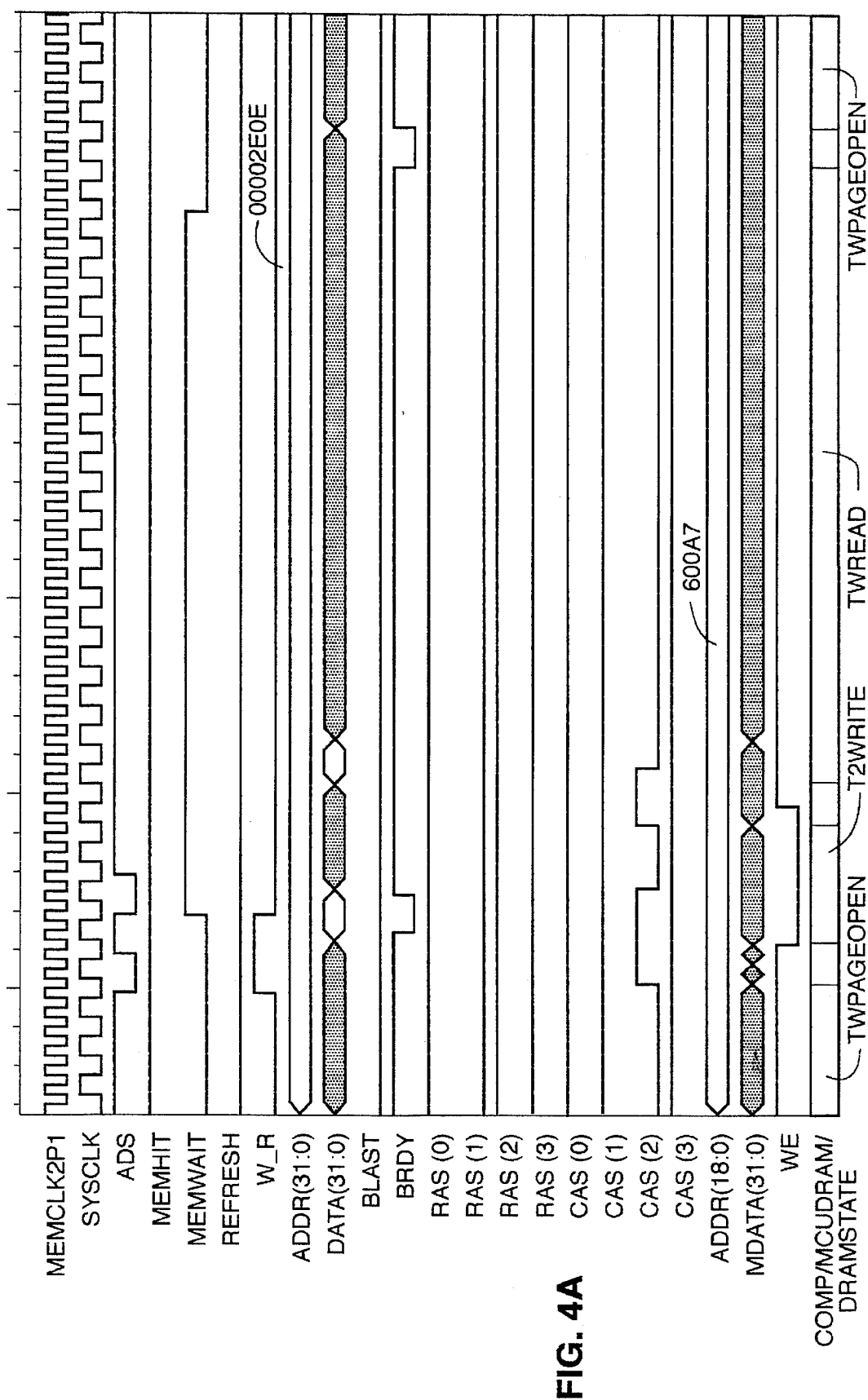
FIGS. 4A–4E show timing diagrams illustrating operation of the system depicted in FIG. 2.

Referring initially to FIG. 4A, a throttled memory read cycle is shown for a situation where two successive accesses to memory are made to the same page of a DRAM bank in main memory. In the initial state, a page in memory is open as shown by the DRAMSTATE notation to indicate a previous memory access to that same page. In this initial period, the RAS(1) line is asserted to indicate that bank 1 of DRAM memory has been accessed and a page in that bank opened. Subsequently, a write cycle is started by the PCI bridge (1) driving the ADS# control signal low, (2) asserting the W/R signal high to indicate a write cycle, and (3) supplying the address and data information on the local bus. In accordance with conventional techniques, the MCU asserts the BRDY# signal early, on the first T2 cycle, before the memory write actually completes its cycle. Shortly thereafter, the MCU asserts the CAS(2) line to complete the data write.

As soon as the PCI bridge receives the BRDY# signal from the MCU, it asserts the ADS# signal to start the next cycle, which is a read cycle, as indicated by the W/R line being driven low. At the same time, the PCI bridge asserts the MEMWAIT signal to throttle down the memory bus. In accordance with the preferred embodiment, the address signal is applied to the MCU while MEMWAIT is asserted. Because the DRAM page is already open, the MCU need not proceed to open the page by changing the state of the RAS lines in the situation shown in FIG. 4A. In the preferred embodiment, however, the MCU asserts the CAS line (in this case CAS(2)) to drive the data to be read onto the memory bus, and thus, onto the local bus. When MEMWAIT is deasserted, the MCU asserts BRDY# to indicate that the data is available and the DRAM page is left open for the next cycle.

Thus, if the address is in the same DRAM page, the MCU 90 throttles down the memory bus 150 by looping through a wait state cycle until MEMWAIT is deasserted by the PCI bridge 80 or until a refresh cycle request is issued. When MEMWAIT is deasserted, the MCU 90 asserts BRDY# and completes the memory access. The DRAM page then remains open until another Master device issues a memory request on a different page, or until a refresh request occurs.

Figure 4B:
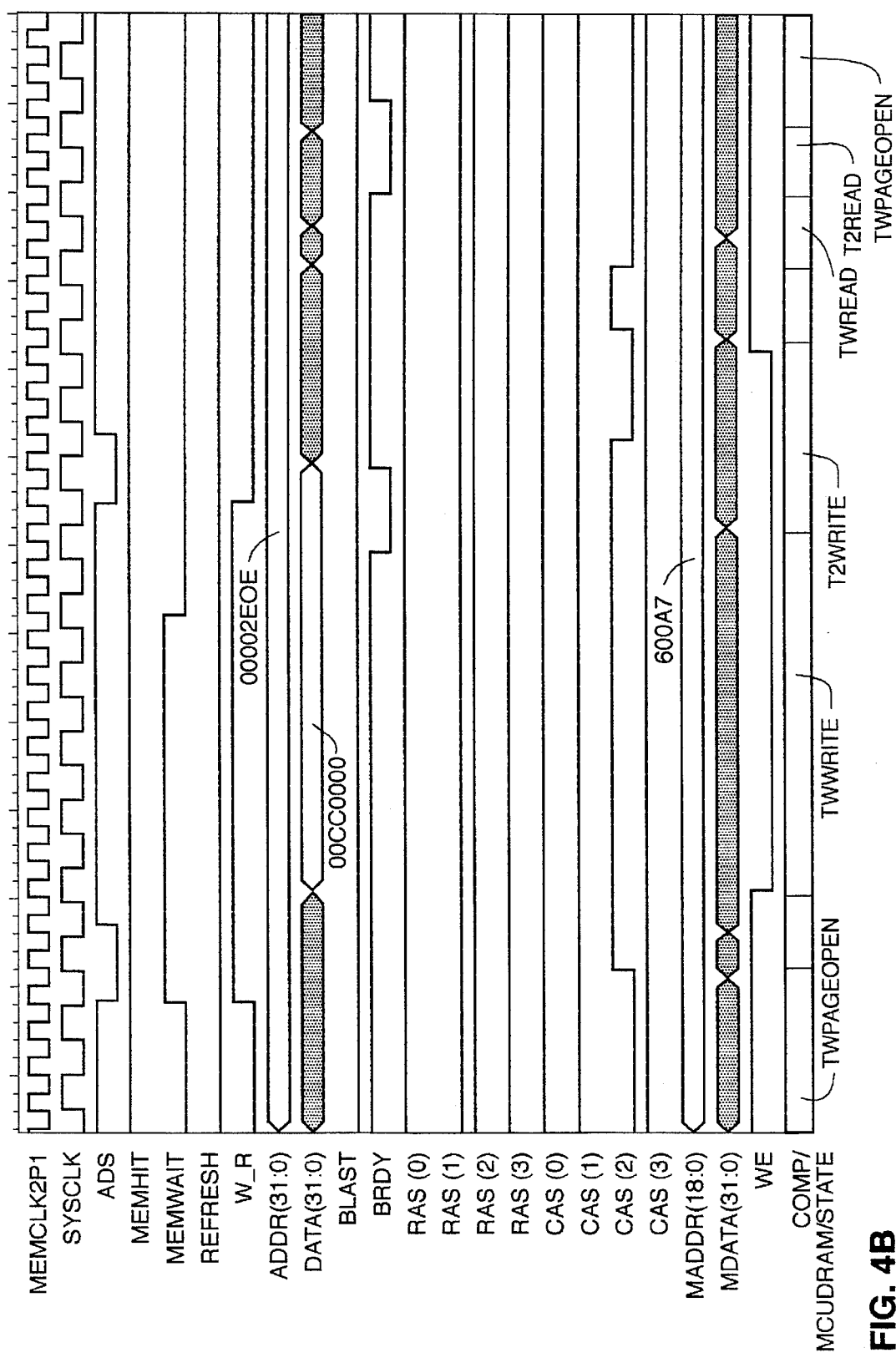

Referring now to FIG. 4B, a throttled memory write cycle to the same DRAM page is shown. Once again, in the initial state the DRAM page is open to indicate a previous access to that page. Subsequently, the PCI bridge asserts the ADS# control signal, asserts the W/R signal to indicate a write cycle, and asserts the MEMWAIT line to indicate that the PCI Master is not ready to transmit data. While the MEMWAIT line is asserted, and in accordance with the preferred embodiment, the PCI bridge proceeds to drive the address of the write cycle to the MCU. Because, however, the proper page already was opened, the state of the RAS lines is not changed. When the MEMWAIT signal is deasserted by the PCI bridge, the MCU asserts BRDY# and completes the write cycle by asserting the appropriate CAS line (CAS(2)). A subsequent read cycle is shown in FIG. 4B without a MEMWAIT signal.

Figure 4C:
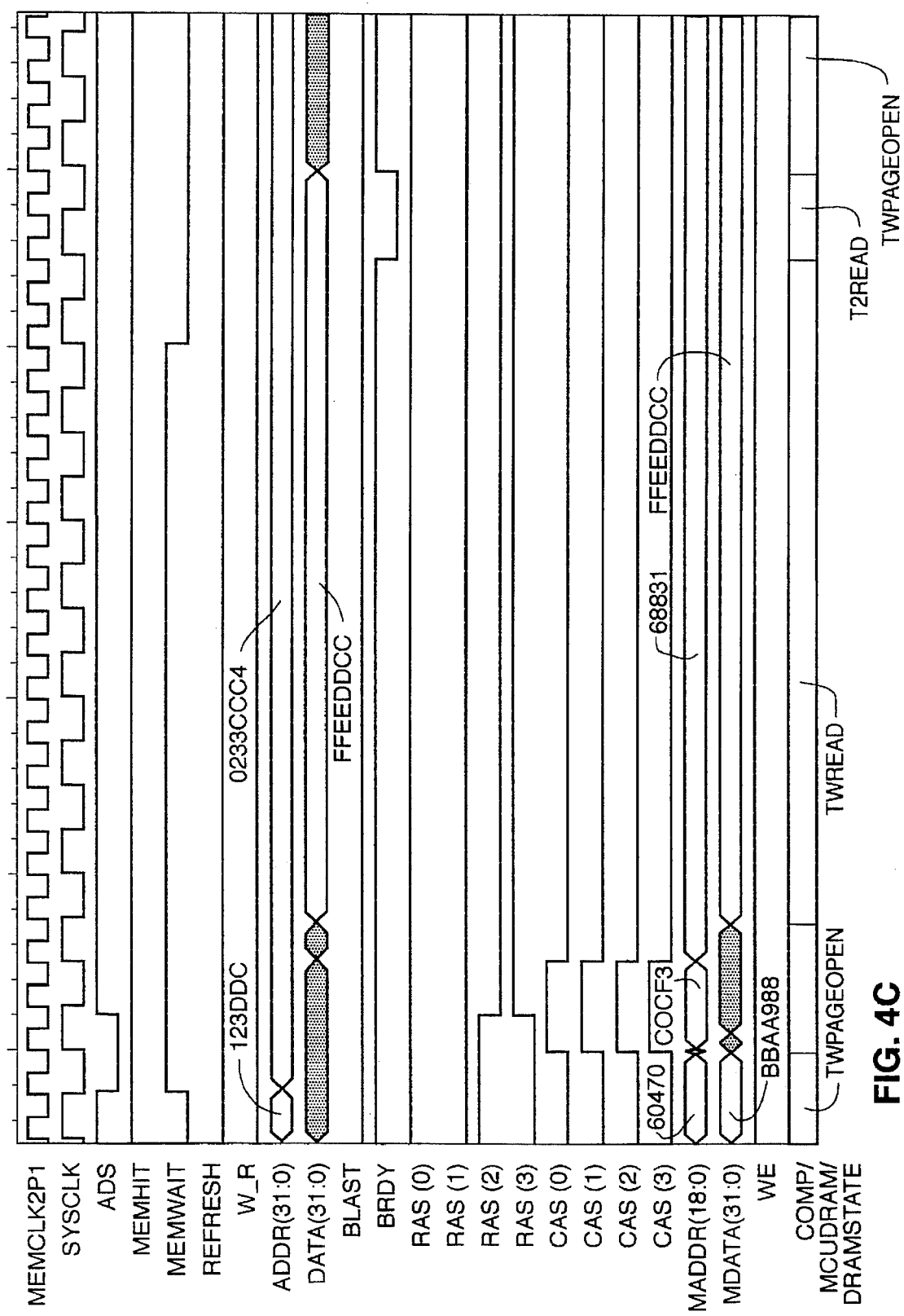

Referring now to FIG. 4C, a throttled memory read cycle is shown to a different DRAM bank. In the initial state, a DRAM page in bank 3 is open from a previous memory access as shown by the assertion of RAS(3). Subsequently, the PCI bridge asserts the ADS# control signal while keeping the R/W line low to indicate a read cycle. At substantially the same time, the PCI bridge asserts the MEMWAIT signal to show that the PCI Master device is not ready to receive data yet. In accordance with the preferred embodiment, the PCI bridge drives the address on the local bus where it is received by the MCU. The MCU decodes the address and changes from DRAM bank 3 to DRAM bank 2 and then drives row address strobe line RAS(2) low while driving RAS(3) high to drive the decoded row address into bank 2. The MCU then opens the proper DRAM page in bank 2 and proceeds to drive the desired data on the memory bus and thus onto the local bus by asserting the four CAS lines. When the MEMWAIT signal is deasserted to indicate that the PCI Master is ready to receive the data, the MCU asserts the BRDY# signal to indicate that the read cycle has been performed.

If the address is to a different DRAM bank, therefore, the MCU closes the current DRAM page of the current bank while MEMWAIT is asserted and immediately opens the DRAM page of the new bank (since there is no RAS precharge cycle time because a different DRAM bank is accessed). The MCU then throttles down the memory bus by looping through a wait state cycle until MEMWAIT is deasserted or a refresh request is issued. After MEMWAIT is deasserted, the MCU asserts BRDY# and completes the memory access. The DRAM page remains open until a subsequent memory access to another page by a Master, or until a refresh request is received. In this sequence, the time to access the DRAM page ($t_{RAC}$) is saved by opening the page ahead of the data access.

Figure 4D:
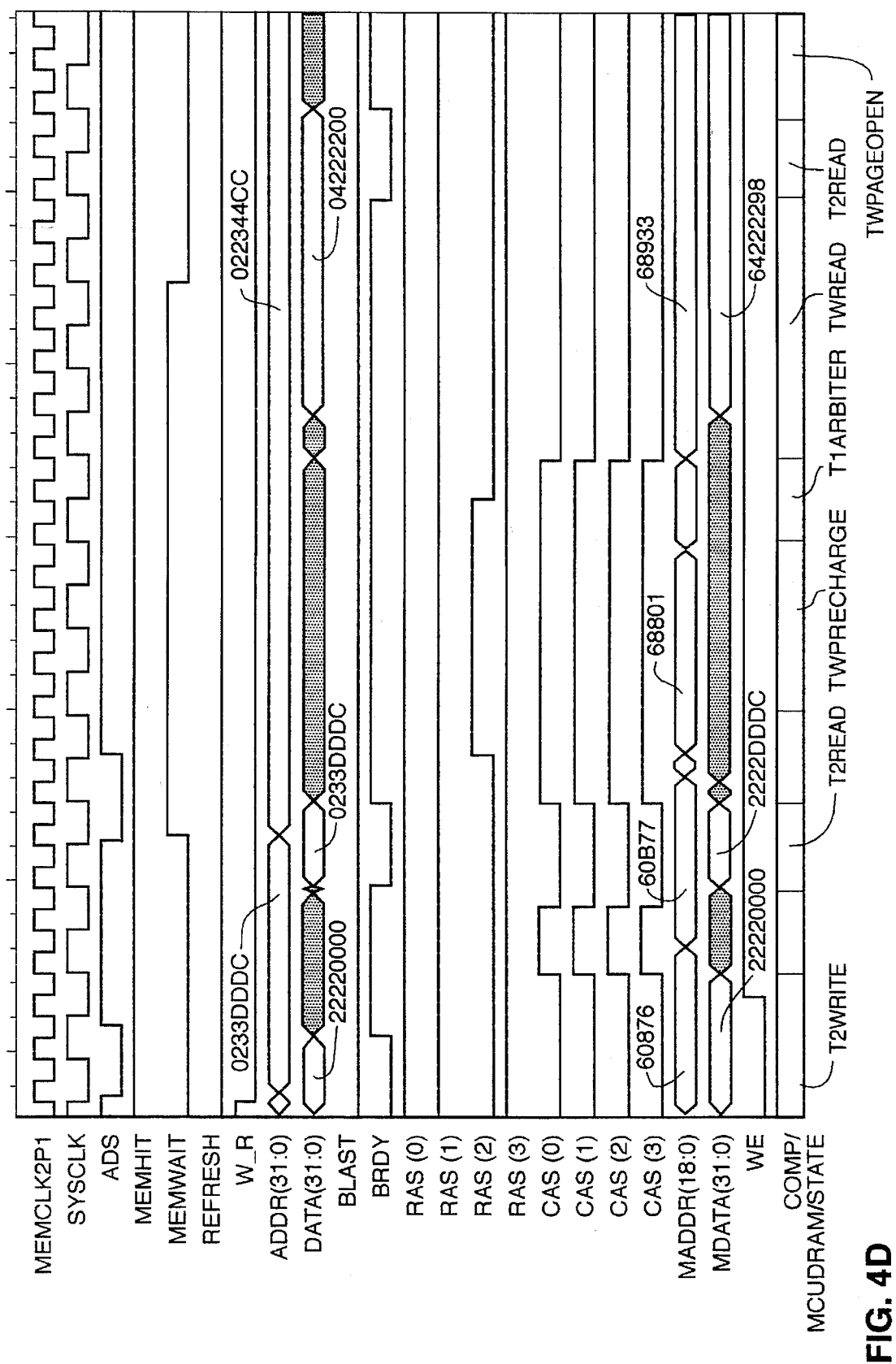

FIG. 4D illustrates a throttled memory read cycle to a different page in memory. The initial two states show a write cycle followed by a read cycle without a MEMWAIT. Subsequently, the PCI bridge asserts the ADS# control signal while simultaneously asserting MEMWAIT while the W/R line is maintained low to indicate a read cycle. While MEMWAIT is asserted, the PCI bridge drives the address on the local bus to the MCU. The MCU decodes the address and opens the appropriate page in memory. Once the page is open, the MCU asserts the CAS lines to drive the data onto the memory bus and thus onto the local bus. When MEMWAIT is deasserted, the MCU asserts BRDY# to indicate that the read cycle is complete.

If the address is on a different DRAM page, therefore, the MCU closes the current DRAM page and advances to a precharge state while MEMWAIT is asserted. Once RAS precharge is complete, the MCU 90 opens the DRAM page and throttles down the memory bus 150 by looping through a wait state cycle until MEMWAIT is deasserted, or until a refresh request is issued. After MEMWAIT is deasserted, the MCU asserts BRDY# and completes the memory access by asserting CAS to enable the particular byte of the DRAM page to be accessed. After the data transfer is completed, the DRAM page is left open until a refresh request is received, or until another Master device issues a memory request to a different page. In this sequence, the RAS precharge cycle time is saved ($t_{RP}$) and the time required to access the DRAM page ($t_{RAC}$) is saved.

Figure 4E:
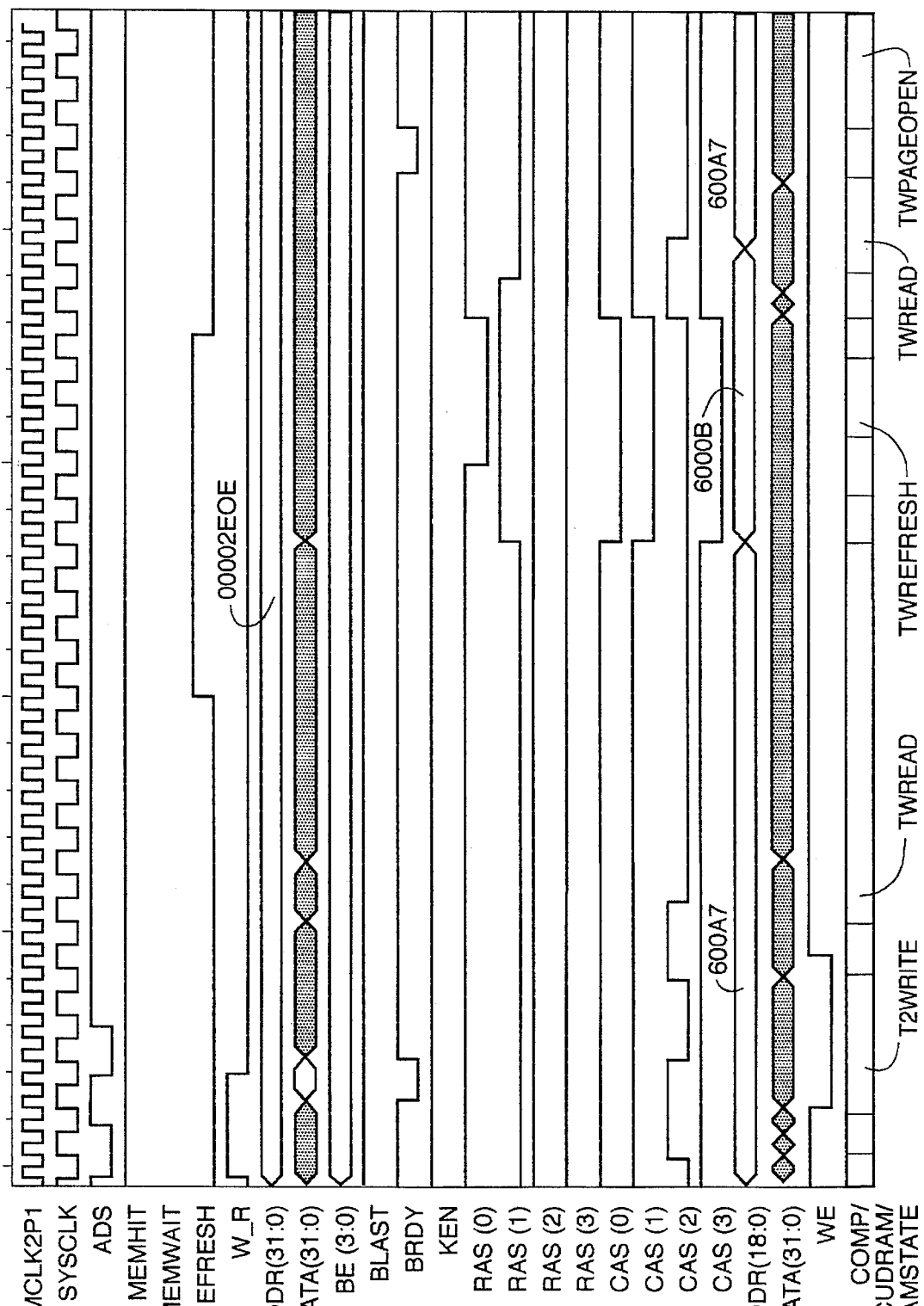

Lastly, FIG. 4E illustrates a throttled memory read cycle with an intervening refresh cycle. The initial state in FIG. 4E shows a write cycle. Subsequently, the PCI bridge asserts the ADS# control signal, drives the W/R signal low and simultaneously asserts MEMWAIT to indicate that the PCI Master is not ready to receive the data. The PCI bridge drives the address on the local bus where it is received by the MCU and used to access the desired page in memory. The MCU then asserts the appropriate column address strobe line CAS(2) to drive the data onto the memory bus. Subsequently, however, while MEMWAIT still is asserted, a refresh request is received by the MCU. The MCU, while MEMWAIT still is asserted, proceeds to perform the refresh cycle for bank 0 by asserting CAS-before-RAS for that bank. After the refresh is complete, the MCU reopens the appropriate page in memory by again asserting RAS(1) and then again drives out the data by asserting CAS(2).

Numerous variations and modifications will become apparent to those skilled in the art once the above disclosure is fully appreciated. It is intended that the following claims be interpreted to embrace all such variations and modifications.

What is claimed is:

1. A method for optimizing the transfer of data between system memory and a PCI Master device, wherein said PCI Master connects to a PCI bridge through a PCI bus, and the PCI bridge resides on a CPU local bus, and the system memory connects to a memory controller through a memory bus, said memory controller also residing on the CPU local bus, comprising the steps of:

(a) asserting ownership of the PCI bus by the PCI Master;
   (b) driving an address signal on the PCI bus by the PCI Master;
   (c) generating an address strobe signal on the CPU local bus by the PCI bridge and driving said address signal on the CPU local bus;
   (d) generating a wait signal by the PCI bridge to indicate the inability of the PCI Master to immediately complete a data phase of a data transaction;
   (e) decoding the address signal by the memory controller;
   (f) opening an appropriate page in the system memory by said memory controller;
   (g) deasserting the wait signal in response to an indication that the PCI Master is ready to complete the data phase; and
   (h) completing the data transaction by the memory controller.

2. A method for optimizing the transfer of data between system memory and a PCI Master device, wherein said PCI Master connects to a PCI bridge through a PCI bus, and the PCI bridge resides on a CPU local bus, and the system memory connects to a memory controller through a memory bus, said memory controller also residing on the CPU local bus, comprising the steps of:

(a) asserting ownership of the PCI bus by the PCI Master;
   (b) driving an address signal on the PCI bus by the PCI Master;
   (c) generating an address strobe signal on the CPU local bus by the PCI bridge and driving said address signal on the CPU local bus;
   (d) generating a memory wait signal by the PCI bridge to indicate the inability of the PCI Master to immediately complete a data phase of a transaction;
   (e) providing said memory wait signal to said memory controller;
   (f) decoding the address signal by the memory controller;
   (g) opening an appropriate page in the system memory by said memory controller while said memory wait signal is asserted and before said PCI Master is ready to complete the data transaction;
   (h) deasserting the wait signal in response to an indication that the PCI Master is ready to complete the data phase; and
   (h) completing the data transaction by the memory controller.

3. A method as in claim 2, wherein the step of opening the appropriate memory page (step (f)) includes the steps of:

(f)(1) applying a row address signal to the system memory; and
   (f)(2) asserting an appropriate row address strobe (RAS) line to enable the row address signal.

4. A method as in claim 3, wherein the memory controller also applies a column address and asserts an appropriate column address strobe (CAS) signal to drive data out of said system memory during a read cycle while the memory wait signal is still asserted.

5. A method as in claim 2, wherein a refresh cycle is performed while said memory wait signal is asserted.

6. A method as in claim 2, wherein the step of completing the data transaction (step (h)), comprises the steps of:

(h)(1) applying a column address signal to said system memory while asserting an appropriate column address strobe (CAS) signal to drive data out of said system memory during a read cycle while the wait signal is still asserted; and
   (h)(2) asserting a BRDY# signal to the PCI bridge.

7. A method as in claim 6, wherein said PCI bridge asserts a TRDY# signal to the PCI Master in response to the BRDY# signal from said memory controller.

8. A method as in claim 7, wherein said PCI bridge asserts said memory wait signal if said PCI Master does not assert an IRDY# signal in response to the TRDY# signal.

9. A method for optimizing the transfer of data between system memory and a PCI Master device during a write cycle, wherein said PCI Master connects to a PCI bridge through a PCI bus, and the PCI bridge resides on a CPU local bus, and the system memory connects to a memory controller through a memory bus, said memory controller also residing on the CPU local bus, comprising the steps of:

(a) the PCI Master gaining ownership of the PCI bus;
   (b) the PCI Master transmitting a burst cycle on the PCI bus;
   (c) said PCI bridge receiving a first address signal and a first data signal from said burst cycle and gaining ownership of said CPU local bus;
   (d) said PCI bridge transmitting said first address signal and said first data signal on said CPU local bus;
   (e) said memory controller writing said first data signal to an address in said system memory corresponding to the first address signal and issuing a memory ready signal to said PCI bridge;
   (f) said PCI bridge issuing a target ready signal to said PCI Master in response to said ready signal from said memory controller;
   (g) said PCI bridge, in the absence of an initiator ready signal from said PCI Master, generating a memory wait signal to the memory controller and providing a second address signal to said memory controller;
   (h) said system memory controller decoding the second address signal to generate a row address and a column address; and
   (i) said system memory controller drying the row address of said second address signal to said system memory and asserting a row address strobe (RAS) signal to said system memory to open an appropriate page in said system memory while said memory wait signal is asserted and before said PCI Master is ready to transmit a second data signal on said PCI bus.

10. A method as in claim 9, wherein said memory controller generates a MEMHIT in response to step (d) if the first address signal is located in system memory.

11. A method as in claim 10, further comprising the step of:

(j) deasserting the wait signal in response to an initiator ready signal from said PCI Master indicating that the PCI Master has driven the second data signal on said PCI bus;
   (k) said system memory controller driving the column address of said second address signal to said system memory and asserting an appropriate column address strobe (CAS) signal to said system memory to enable said second data signal to be written to said system memory.

12. A method as in claim 9, wherein a refresh cycle is performed to a bank of said system memory while the wait signal is asserted.

13. A method as in claim 10, wherein a refresh cycle is performed, while the wait state is asserted, to the same bank of memory where an appropriate page in memory is opened.

14. A method as in claim 10, wherein a refresh cycle is performed, while the wait state is asserted, to the same bank of memory where an appropriate page in memory is opened.

15. A method as in claim 12, wherein the refresh cycle comprises a CAS-before RAS sequence.

16. A method as in claim 12, wherein each bank of memory is refreshed independently.

17. A method for optimizing the transfer of data between system memory and a PCI Master device during a read cycle, wherein said PCI Master connects to a PCI bridge through a PCI bus, and the PCI bridge resides on a CPU local bus, and the system memory connects to a memory controller through a memory bus, said memory controller also residing on the CPU local bus, comprising the steps of:

(a) the PCI Master gaining ownership of the PCI bus;

(b) the PCI Master transmitting on the PCI bus a first address signal in said system memory to he read;

(c) said PCI bridge receiving said first address signal and gaining ownership of said CPU local bus;

(d) said PCI bridge transmitting said first address signal on said CPU local bus;

(e) said memory controller receiving said first address signal and reading a first data signal in said system memory corresponding to the first address signal and driving said first data signal on said local bus and issuing a memory ready signal to said PCI bridge;

(f) said PCI bridge issuing a target ready signal to said PCI Master in response to said memory ready signal from said memory controller;

(g) said PCI bridge, in the absence of an initiator ready signal from said PCI Master, generating a memory wait signal to the memory controller and providing a second address signal to said memory controller.

(h) said memory controller decoding the second address signal to generate a row address and a column address; and (i) said memory controller driving the row address of said second address signal to said system memory and asserting a row address strobe (RAS) signal to said system memory to open an appropriate page in memory while said memory wait signal is asserted and before said PCI Master is ready to receive a second data signal.

18. A method as in claim 17, wherein said memory controller generates a MEMHIT in response to step (d) if the first address signal is located in system memory.

19. A method as in claim 18, further comprising the step of:

(j) said memory controller driving the column address of said second address signal to said system memory and asserting a column address strobe (CAS) to said system memory to drive said second data signal corresponding to said second address signal onto said CPU local bus.

20. A method as in claim 19, further comprising the steps of:

(k) deasserting the wait signal in response to an initiator ready signal from said PCI Master indicating that the PCI Master is ready to receive said first data signal;

(l) said memory controller issuing a memory ready signal;

(m) said PCI bridge asserting a target ready signal to said PCI Master and initiating another read cycle.

21. A method as in claim 17, wherein a refresh cycle is performed to a bank of said system memory while the memory wait signal is asserted.

22. A system for optimizing memory access times in a computer, comprising:

a system memory for storing and accessing data;

a memory controller unit connected to said system memory for controlling accesses to said system memory;

a PCI bridge connected to said memory controller unit through a CPU local bus;

a peripheral PCI Master device connected to said PCI bridge through a PCI bus, wherein said PCI Master device asserts ownership of the PCI bus to complete data transactions to the system memory and wherein said PCI bridge asserts ownership of the CPU local bus when the PCI Master asserts ownership of the PCI bus; and a CPU core connected to said CPU local bus;

wherein said PCI bridge asserts a memory wait signal to the memory controller and at substantially the same time drives an address in said system memory corresponding to the next data transaction on the CPU local bus to the memory controller unit when the PCI Master device delays in completing a data transfer;

wherein said memory controller opens an appropriate page in said system memory while said memory wait signal is asserted and while said PCI Master delays in completing the data transfer.

23. A system as in claim 22, wherein said system memory comprises four separate banks of DRAM chips.

24. A system as in claim 23, further comprising a system timer for generating refresh request cycles for the banks of DRAM chips approximately every 15.625/4 microseconds.

25. A system as in claim 24, wherein a refresh cycle is generated in each bank of said DRAM chips approximately every 15.625 microseconds.

26. A system as in claim 25, wherein refresh cycles are staggered in the four banks.

27. A system as in claim 22, wherein said PCI bridge asserts said memory wait signal in a read cycle upon the failure of said PCI Master to issue a ready signal when data is driven on the PCI bus.

28. A system as in claim 22, wherein said PCI bridge asserts said wait signal upon the failure of said PCI master to issue a ready signal after the PCI bridge issues a ready signal and while a frame cycle signal remains asserted.

* * * * *